April 28, 1925.

J. W. FLOWER

HYDRANT VALVE

Original Filed March 31, 1921

1,535,912

Inventor
John W. Flower.
By Edward N. Pagelsen,
Attorney

Patented Apr. 28, 1925.

1,535,912

UNITED STATES PATENT OFFICE.

JOHN W. FLOWER, OF DETROIT, MICHIGAN, ASSIGNOR, BY MESNE ASSIGNMENTS, TO MICHIGAN VALVE FOUNDRY AND ENGINEERING COMPANY, OF DETROIT, MICHIGAN, A CORPORATION OF MICHIGAN.

HYDRANT VALVE.

Application filed March 31, 1921, Serial No. 457,251. Renewed October 18, 1923.

*To all whom it may concern:*

Be it known that I, JOHN W. FLOWER, a citizen of the United States, and residing at Detroit, in the county of Wayne and State of Michigan, have invented a new and Improved Hydrant Valve, of which the following is a specification.

This invention relates to the construction of valves for fire hydrants, particularly for hydrants connected to high pressure water mains, and its object is to provide a hydrant valve which can readily be opened against a high pressure of water.

This invention consists, in combination with a fire hydrant having a valve seat and a valve to engage the seat, a stem whereby the valve may be moved from its seat, and a second pressure receiving member connected to the stem, the valve and the second member being pressed in opposite directions by the water when the valve is on its seat so that said valve may be moved from its seat with a minimum expenditure of force.

It also consists in the details of construction illustrated in the accompanying drawing and particularly pointed out in the claims.

Figure 1:
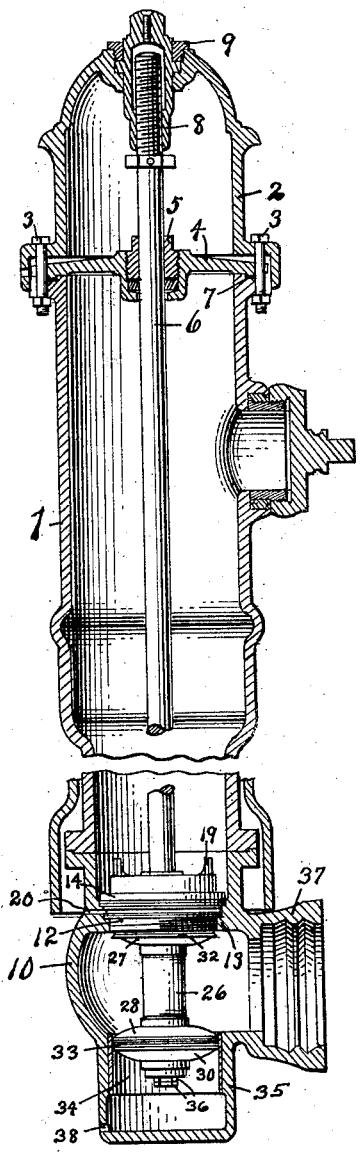
Figure 2:
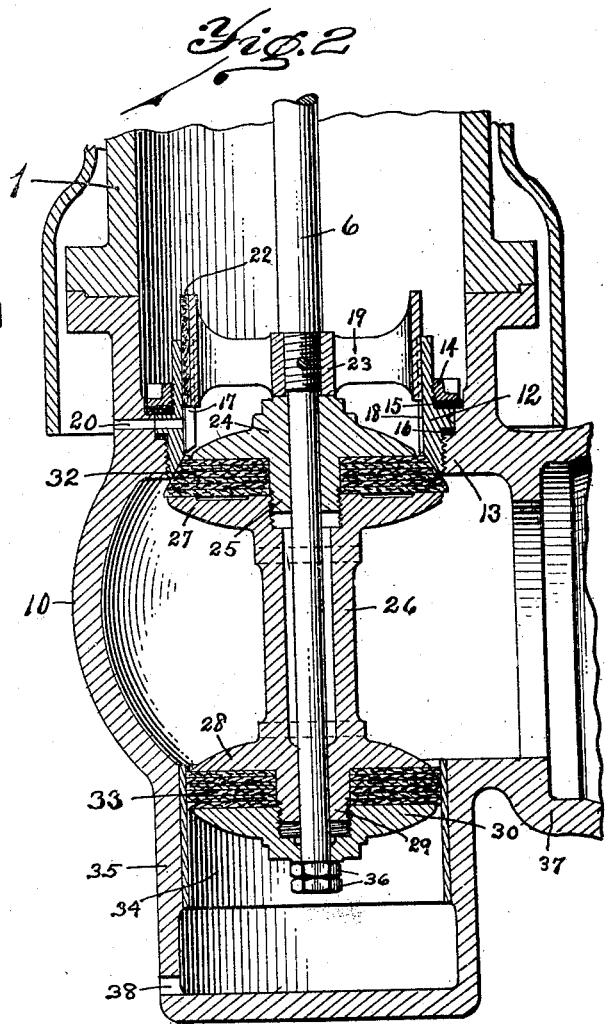

In the drawing, Fig. 1 is a longitudinal central section of a fire hydrant embodying my present invention. Fig. 2 is a similar section of the lower end thereof on a larger scale.

Similar reference characters refer to like parts throughout the several views.

The general structure of the hydrant shown in the drawing is well known and consists of a body 1 to which the hood 2 is connected by the bolts 3. A diaphragm 4 has a stuffing box 5 to prevent leakage around the stem 6 and a ring 7 forms a joint between the head and body. The upper end of the stem is threaded in the nut 8, held in position by the bushing 9.

The lower end of the body 1 connects to the valve chamber 10, and a valve seat 12 screws into the internal shoulder 13 of this chamber, a jamb nut 14 preventing turning of the seat and the packing rings 15 and 16 preventing leakage. The interior of the seat is formed with grooves 17 and 18 for the cross head 19 in which the stem is secured and whereby the stem is prevented from turning. A drain passage 20 through the valve chamber and valve seat is normally open but will be closed by the packing strip 22, preferably leather, when the valve stem and the cross head 19 is moved down.

On the stem next the hub 23 of the cross head 19 is a disk 24 having a threaded hub 25. On the stem is a spool 26 having end flanges 27 and 28, a recess to receive the threaded hub 25, and a threaded hub 29. A second disk 30 is adapted to be screwed onto this hub 29. Layers of leather 32 are tightly pressed between the flange 27 and disk 24 and other layers 33 between the flange 28 and disk 30. The layers 32 are turned conical to constitute a valve to fit the seat 12 while the layers 33 are turned cylindrical to fit the cylinder 34 in the extension 35 of the valve chamber. The united spool, disks, valve 32, and piston 33 are shown held on the valve stem by the nuts 36. A hub 37 on the valve chamber is adapted to receive an extension of the water main and the extension 35 below the piston valve 33 is provided with a vent or drain 38.

The operation of the valve is rendered very easy by the downward pressure of the water on the piston 33 being but little less than the upward pressure on the valve 32. This not only makes for ease of operating, but also prevents excessive wear and breakage of the parts which occur so often when hydrant valves are forced open against high water pressures.

The details of the construction and proportions of the parts may all be changed by those skilled in the art without departing from the spirit of my invention as set forth in the following claims.

I claim:—

1. In a hydrant, the combination of a body and a valve chamber connected to the lower end thereof, a valve seat in said chamber, an upright valve stem central with the valve seat, a guide for the stem slidable in the valve seat, said valve chamber having a cylindrical downward extension in alinement with the valve stem, a spool mounted on the valve stem and having a flange at each end, a disk on the stem at each end of the spool, a conical valve at the upper end of the spool between the flange and disk adapted to engage the valve seat and a piston on the stem at the lower end of the spool between the flange and disk adapted to slide in said cylindrical extension of the valve chamber, said chamber having an inlet between the valve seat and cylindrical extension and a vent in said extension.

2. In a hydrant, the combination of a body and a valve chamber connected to the lower end thereof, a valve seat in said chamber, an upright valve stem central with the valve seat, a guide for the stem slidable in the valve seat, said valve chamber having a cylindrical downward extension in alinement with the valve stem, a spool mounted on the valve stem and having a flange at each end, a disk on the stem at each end of the spool, a conical valve at the upper end of the spool between the flange and disk adapted to engage the valve seat and a piston on the stem at the lower end of the spool between the flange and disk adapted to slide in said cylindrical extension of the valve chamber, said chamber having an inlet between the valve seat and cylindrical extension and a vent in said extension, the effective area of the piston being less than that of the conical valve.

JOHN W. FLOWER.